US010993132B2

(12) United States Patent
Zhu et al.

(10) Patent No.: US 10,993,132 B2
(45) Date of Patent: Apr. 27, 2021

(54) GENERALIZED MOBILITY SCHEDULING FRAMEWORK

(71) Applicant: QUALCOMM Incorporated, San Diego, CA (US)

(72) Inventors: Jun Zhu, San Diego, CA (US); Yong Li, San Diego, CA (US); Ruhua He, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 16/246,421

(22) Filed: Jan. 11, 2019

(65) Prior Publication Data
US 2019/0230544 A1 Jul. 25, 2019

Related U.S. Application Data

(60) Provisional application No. 62/620,335, filed on Jan. 22, 2018.

(51) Int. Cl.
*H04W 24/10* (2009.01)
*H04W 56/00* (2009.01)
(Continued)

(52) U.S. Cl.
CPC .......... *H04W 24/10* (2013.01); *H04B 7/0617* (2013.01); *H04W 56/00* (2013.01);
(Continued)

(58) Field of Classification Search
CPC .... H04B 7/0617; H04W 24/10; H04W 56/00; H04W 56/001; H04W 72/12; H04W 88/02; H04W 16/28
See application file for complete search history.

(56) References Cited

U.S. PATENT DOCUMENTS

| 2017/0237477 A1* | 8/2017 | Fujio | H04W 16/28 370/329 |
| 2017/0303173 A1* | 10/2017 | Cedergren | H04W 36/06 |
| 2017/0331577 A1* | 11/2017 | Parkvall | H04L 29/06231 |

OTHER PUBLICATIONS

Intel Corporation: "Cell Reselection and Measurements", 3GPP Draft; R2-1700344, 3rd Generation Partnership Project (3GPP), Mobile Competence Centre ; 650. Route Des Lucioles ; F-06921 Sophia-Antipolis Cedex; France, vol. RAN WG2. No. Spokane, USA; 20170117-20170119, Jan. 17, 2017 (Jan. 17, 2017), XP051210923, 4 Pages, Retrieved from the Internet: URL:http://www.3gpp.org/ftp/Meetings_3GPP_SYNC/RAN2/Docs/ [retrieved on Jan. 17, 2017].

(Continued)

*Primary Examiner* — Khoa Huynh
(74) *Attorney, Agent, or Firm* — Holland & Hart LLP/QUALCOMM Incorporated

(57) ABSTRACT

Methods, systems, and devices for wireless communications are described. A wireless device such as a user equipment (UE) may determine a set of scheduled synchronization signal transmission times. A first subset of the set of scheduled synchronization signal transmission times may be allocated for dynamic measurement. The wireless device may select at least one candidate beam from a set of candidate beams for a dynamic measurement during one of the transmission times in the first subset. The at least one candidate beam may be selected based at least in part on a fairness metric, a signal strength metric, a timing metric, or a combination thereof. The wireless device may perform a measure procedure on the selected at least one candidate beam and may transmit a measurement report based at least in part on the measure procedure to another wireless device (e.g., a base station).

30 Claims, 10 Drawing Sheets

(51) Int. Cl.
    *H04B 7/06*     (2006.01)
    *H04W 72/12*    (2009.01)
    *H04W 88/02*    (2009.01)

(52) U.S. Cl.
    CPC ......... *H04W 56/001* (2013.01); *H04W 72/12* (2013.01); *H04W 88/02* (2013.01)

(56) References Cited

OTHER PUBLICATIONS

International Search Report and Written Opinion—PCT/US2019/013512—ISA/EPO—dated Jun. 6, 2019.
Qualcomm Incorporated: "NB-PSS and NB-SSS Design", 3GPP Draft; R1-160105 NB-PSS and NB-SSS Design, 3rd Generation Partnership Project (3GPP), Mobile Competence Centre ; 650, Route Des Lucioles ; F-06921 Sophia-Antipolis Cedex ; France vol. RAN WG1, no. Budapest, HU; Jan. 18, 2016-Jan. 20, 2016, Jan. 17, 2016 (Jan. 17, 2016), pp. 1-11, XP051053425, Retrieved from the Internet: URL: http://www.3gpp.org/ftp/Meetings_3GPP_SYNC/RAN1/Docs/ [retrieved on Jan. 17, 2016], paragraph [0002]; figure 1.
Samsung: "NR Signals for Downlink Beam Management", 3GPP Draft; R2-1713796 NR Signals for Downlink Beam Management, 3rd Generation Partnership Project (3GPP), Mobile Competence Centre ; 650, Route Des Lucioles ; F-06921 Sophia-Antipolis Cedex; France, vol. RAN WG2, No. Reno. USA; 20171127-20171129, Nov. 17, 2017 (Nov. 17, 2017),XP051372451, 6 Pages, Retrieved from the Internet: URL:http://www.3gpp.org/ftp/tsg%5Fran/WG2%5FRL2/TSGR2%5F100/Docs/ [retrieved on Nov. 17, 2017].
ZTE et al., "Discussion on Beam Recovery Mechanism", 3GPP Draft; R1-1704400 Discussion on Beam Recovery Mechanism, 3rd Generation Partnership Project (3GPP), Mobile Competence Centre ; 650, Route Des Lucioles ; F-06921 Sophia-Antipolis Cedex; France, vol. RAN WG1, No. Spokane, USA; 20170403-20170407, Apr. 2, 2017 (Apr. 2, 2017), XP051242548, 6 Pages, Retrieved from the Internet: URL:http://www.3gpp.org/ftp/Meetings_3GPP_SYNC/RAN1/Docs/ [retrieved on Apr. 2, 2017].

* cited by examiner

GENERALIZED MOBILITY SCHEDULING FRAMEWORK

CROSS REFERENCES

The present Application for Patent claims the benefit of U.S. Provisional Patent Application No. 62/620,335 by Zhu et al., entitled "GENERALIZED MOBILITY SCHEDULING FRAMEWORK," filed Jan. 22, 2018, assigned to the assignee hereof, and expressly incorporated by reference herein.

BACKGROUND

The following relates generally to wireless communication, and more specifically to generalized mobility scheduling framework.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., millimeter wave (mmW) systems), a base station and a UE may communicate via one or more directional beams. A transmitter (e.g., a base station) may engage in a beam sweeping procedure to establish an active beam pair with a receiver (e.g., a UE). An active beam pair may include an active transmit beam of the transmitter and a corresponding active receive beam of the receiver. The transmit beams and the receive beams in an active beam pair may be refined through, for example, beam refinement procedures. The beam sweeping and beam refinement procedures may involve transmitting multiple directional beams that have different beamforming parameters. A receiver may receive some or all of the beams transmitted with different beamforming parameters and measure one or more characteristics for each beam (e.g., a receive power, a gain, or a channel quality indication (CQI) metric). The receiver may then provide an indication back to the transmitter indicating one or more of the measured characteristics, one or more beams that are preferred for establishing an active beam pair, or any combination thereof. However, in some cases, this procedure may be inefficient and result in significant latency in the beam selection procedure (e.g., when the receiver selects a beam, beam pair, or beam parameter from multiple different transmit beams, receive beams, cells, component carriers, etc.).

SUMMARY

The described techniques relate to improved methods, systems, devices, or apparatuses that support a generalized mobility scheduling framework. Generally, the described techniques provide for a user equipment (UE) that may dynamically select one or more candidate beams for measurement during a synchronization signal transmission time. The UE may determine a set of scheduled synchronization signal transmission times. The UE may select one or more candidate beam from a set of candidate beams for a dynamic measurement during one of a first subset of the scheduled synchronization signal transmission times. The first subset of the set of scheduled synchronization signal transmission times may be allocated for dynamic measurement. The UE may perform a measure procedure on the selected candidate beams during one of the first subset of scheduled synchronization signal transmission times. The UE may then transmit a measurement report corresponding to the measure procedure.

A method for wireless communication at a UE is described. The method may include determining a set of scheduled synchronization signal transmission times, selecting at least one candidate beam from a set of candidate beams for a dynamic measurement during one of a first subset of the set of scheduled synchronization signal transmission times, where the first subset of the set of scheduled synchronization signal transmission times is allocated for dynamic measurement, performing a measure procedure on the at least one candidate beam during the one of the first subset of scheduled synchronization signal transmission times, and transmitting at least one measurement report corresponding to the measure procedure performed on the at least one candidate beam.

An apparatus for wireless communication at a UE is described. The apparatus may include means for determining a set of scheduled synchronization signal transmission times, means for selecting at least one candidate beam from a set of candidate beams for a dynamic measurement during one of a first subset of the set of scheduled synchronization signal transmission times, where the first subset of the set of scheduled synchronization signal transmission times is allocated for dynamic measurement, means for performing a measure procedure on the at least one candidate beam during the one of the first subset of scheduled synchronization signal transmission times, and means for transmitting at least one measurement report corresponding to the measure procedure performed on the at least one candidate beam.

Another apparatus for wireless communication at a UE is described. The apparatus may include a processor, memory in electronic communication with the processor, and instructions stored in the memory. The instructions may be operable to cause the processor to determine a set of scheduled synchronization signal transmission times, select at least one candidate beam from a set of candidate beams for a dynamic measurement during one of a first subset of the set of scheduled synchronization signal transmission times, where the first subset of the set of scheduled synchronization signal transmission times is allocated for dynamic measurement, perform a measure procedure on the at least one candidate beam during the one of the first subset of scheduled synchronization signal transmission times, and transmit at least one measurement report corresponding to the measure procedure performed on the at least one candidate beam.

A non-transitory computer-readable medium for wireless communication at a UE is described. The non-transitory computer-readable medium may include instructions operable to cause a processor to determine, by a UE, a set of scheduled synchronization signal transmission times, select, by the UE, at least one candidate beam from a set of candidate beams for a dynamic measurement during one of a first subset of the set of scheduled synchronization signal transmission times, where the first subset of the set of scheduled synchronization signal transmission times is allocated for dynamic measurement, perform a measure procedure on the at least one candidate beam during the one of the first subset of scheduled synchronization signal transmission times, and transmit at least one measurement report corresponding to the measure procedure performed on the at least one candidate beam.

In some examples of the method, apparatus, and non-transitory computer-readable medium described above, performing the measure procedure on the at least one candidate beam during the one of the first subset of scheduled synchronization signal transmission times may further include processes, features, means, or instructions for selecting a UE receive beam for the one of the first subset of scheduled synchronization signal transmission times and selecting the at least one candidate beam from a subset of the set of candidate beams corresponding to the selected UE receive beam.

In some examples of the method, apparatus, and non-transitory computer-readable medium described above, the set of scheduled synchronization signal transmission times may be determined based at least in part on a search and measure period. In some examples of the method, apparatus, and non-transitory computer-readable medium described above, performing the measure procedure on the at least one candidate beam during the one of the first subset of scheduled synchronization signal transmission times may further include processes, features, means, or instructions for identifying a set of priority candidate beams from the set of candidate beams and performing the measure procedure on each of the set of priority candidate beams at least once during the search and measure period.

In some examples of the method, apparatus, and non-transitory computer-readable medium described above, the at least one candidate beam may be selected from the set of candidate beams based at least in part on a fairness metric, a signal strength metric, a spatial metric, a timing metric, or a combination thereof. In some examples of the method, apparatus, and non-transitory computer-readable medium described above, the fairness metric is an example of a weighted fairness metric. In some examples of the method, apparatus, and non-transitory computer-readable medium described above, the signal strength metric includes a signal strength based on historical measurements. In some examples of the method, apparatus, and non-transitory computer-readable medium described above, the spatial metric includes a spatial distance from a serving beam. In some examples of the method, apparatus, and non-transitory computer-readable medium described above, the timing metric includes a no visit time.

Some examples of the method, apparatus, and non-transitory computer-readable medium described above may further include processes, features, means, or instructions for performing a beam sweep procedure for each of a set of UE receive beams during a second subset of the set of scheduled synchronization signal transmission times different than the first subset of the set of scheduled synchronization signal transmission times, where the second subset of the set of scheduled synchronization signal transmission times may be allocated for static measurement based at least in part on a number of UE receive beams in the set of UE receive beams.

Some examples of the method, apparatus, and non-transitory computer-readable medium described above may further include processes, features, means, or instructions for performing an additional measure procedure on at least one beam identified based at least in part on the beam sweep procedure during the second subset of the set of scheduled synchronization signal transmission times. In some examples of the method, apparatus, and non-transitory computer-readable medium described above, the set of candidate beams may be determined based at least in part on the beam sweep procedure for each of the set of UE receive beams.

DETAILED DESCRIPTION

Figure 1:
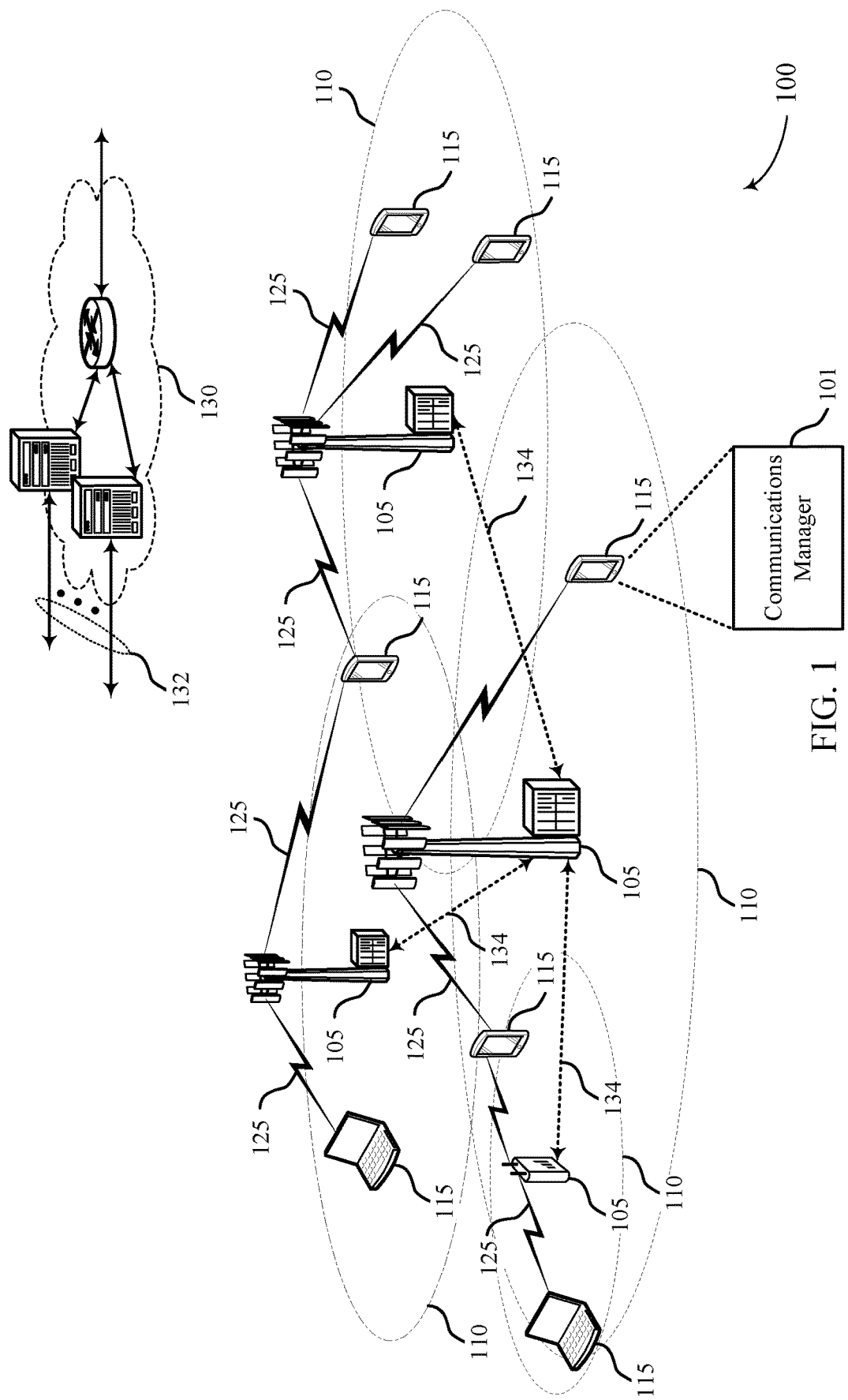
FIGS. 1 and 2 illustrate examples of wireless communications systems in accordance with aspects of the present disclosure.

In systems that use directional beams, a user equipment (UE) may use a "round-robin" sweep of all beams to determine which beams to use for establishing an active beam pair. In such a round-robin sweep, the UE may discover beams by measuring all base station beams corresponding to a particular UE beam during a scheduled synchronization signal transmission time. The UE may perform such measurement once for each UE receive beam during a measurement period. In the other scheduled synchronization signal transmission times during the measurement period, the UE may refrain from performing any measurements. The round-robin sweep may allow the UE to periodically measure each beam to monitor changes to the beam characteristics. However, a round-robin sweep may not provide an efficient manner of measuring the available beams. For example, both current serving beams and beams that do not provide any communication may be measured at the same rate.

In order to improve the efficiency of beam measurement, the UE may divide a set of scheduled synchronization signal transmission times into a first subset and a second subset. The first subset may be allocated for dynamic measurement. In each of the scheduled synchronization signal transmission times in the first subset, the UE may determine which beams to measure (e.g., whether to measure each beam of a set of beams), for example, based at least in part on a metric function. For example, a "beam" to measurement may correspond to a particular combination of a base station beam, a UE beam, a component carrier, and a cell. In some cases, the UE may determine which beams to measure based at least in part on a fairness metric (e.g., a weighted fairness metric), a signal strength metric (e.g., a historical signal strength), a spatial metric (e.g., a spatial distance from a serving beam), a time metric (e.g., a no-visit time), or a combination thereof. Accordingly, higher priority beams may be measured more often than lower priority beams.

In some examples, the UE may use two-step scheduling to select one or more beams for measurement. The UE may first select a UE receive beam from the available UE receive beams. The UE may then select one or more candidate beams corresponding to the UE receive beam for measurement during the dynamic transmission time.

In some examples, the UE may select the candidate beams from a set of candidate beams. The set of candidate beams may include all beams discovered during static measurement transmission times. In some cases, the UE may determine not to perform any measurements during a dynamic transmission time based on a tradeoff between performance and power consumption.

The second subset may be allocated for static measurement. During the static transmission times, the UE may select a UE receive beam and may discover beams corresponding to the UE receive beam, e.g., using a beam sweeping procedure, such as a round-robin sweep. Each UE receive beam may be swept once during each measurement period. The beams discovered during the static transmission times may be used to update the set of candidate beams from which the UE selects during the dynamic transmission times.

Using the combination of static and dynamic measurement, the UE may optimize a tradeoff between performance, mobility, and fairness for beam management. This generalized mobility scheduling framework may support more efficient measuring across a number of beam dimensions in mmW systems (e.g., component carriers, cells, base station beams, and UE beams). As such, the UE may robustly track a "best" beam for a serving cell (e.g., a beam that maximizes throughput for the UE, the corresponding base station, or both) by prioritizing measurements for beams that are more likely to result in better performance. The UE may use an equation for prioritizing beams (e.g., pseudo-omni beams) that balances performance with fairness, such that no beams will be skipped entirely in the beam management process. In some cases, the UE may fallback to a fixed period scheduler (e.g., using a round-robin sweep) without dynamic scheduling in certain situations.

Aspects of the disclosure are initially described in the context of wireless communications systems. Aspects of the disclosure are further illustrated by and described with reference to apparatus diagrams, system diagrams, and flowcharts that relate to generalized mobility scheduling framework.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of a received signal with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink component carriers and one or more uplink component carriers according to a CA configuration. CA may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

UEs 115 may include a communications manager 101, which may dynamically select candidate beams for measurement during dynamic transmission times. The communications manager 101 may determine a set of scheduled synchronization signal transmission times. A first subset of the set of scheduled synchronization signal transmission times may be allocated for dynamic measurement and a second subset of the set of scheduled synchronization signal transmission times may be allocated for static measurement.

During each of the dynamic transmission times, the communications manager 101 may select one or more candidate beams for dynamic measurement. The communications manager 101 may select the one or more candidate beams based at least in part on a metric function. The one or more candidate beams may be selected from a set of candidate beams. In some examples, the communications manager 101 may first select a UE receive beam from the available UE receive beams and may then select one or more candidate beams corresponding to the selected UE receive beam for measurement (e.g., base station transmit beams carrying signals that can be received on the UE receive beam).

The communications manager 101 may select the one or more candidate beams based at least in part on a fairness metric, a signal strength metric, a spatial metric, a time metric, or a combination thereof. In some examples, the communications manager 101 may select the one or more candidate beams based at least in part on a weighted fairness metric. In some examples, the communications manager 101 may select the one or more candidates based at least in part on historical signal strength measurements. In some examples, the communications manager 101 may select the one or more candidates based at least in part on a spatial distance from a current serving beam. In some examples, the communications manager 101 may select the one or more candidates based at least in part on a no visit time.

In some examples, the communications manager 101 may identify a set of priority candidate beams. The set of priority candidate beams may be a subset of the set of candidate beams. The set of priority candidate beams may include all beams that meet one or more priority criteria. For example, the set of priority candidate beams may include all current serving beams. As another example, the set of priority candidate beams may include all beams having a signal strength above a signal strength threshold. The communications manager 101 may select candidate beams for dynamic measurement such that each beam in the set of priority beams may be measured in a search and measure period. The search and measure period may be based at least in part on the number of candidate beams, a hardware measure capability limit, or a combination thereof.

During each of the static transmission times, the communications manager 101 may perform a beam sweeping procedure to discover beams that may be used for communication with a base station. The communications manager 101 may update the set of candidate beams based on the beams discovered during the beam sweeping procedure. In some examples, the communications manager 101 may measure one or more of the discovered beams during the static transmission time, e.g., based at least in part on a hardware measure capability.

Figure 2:
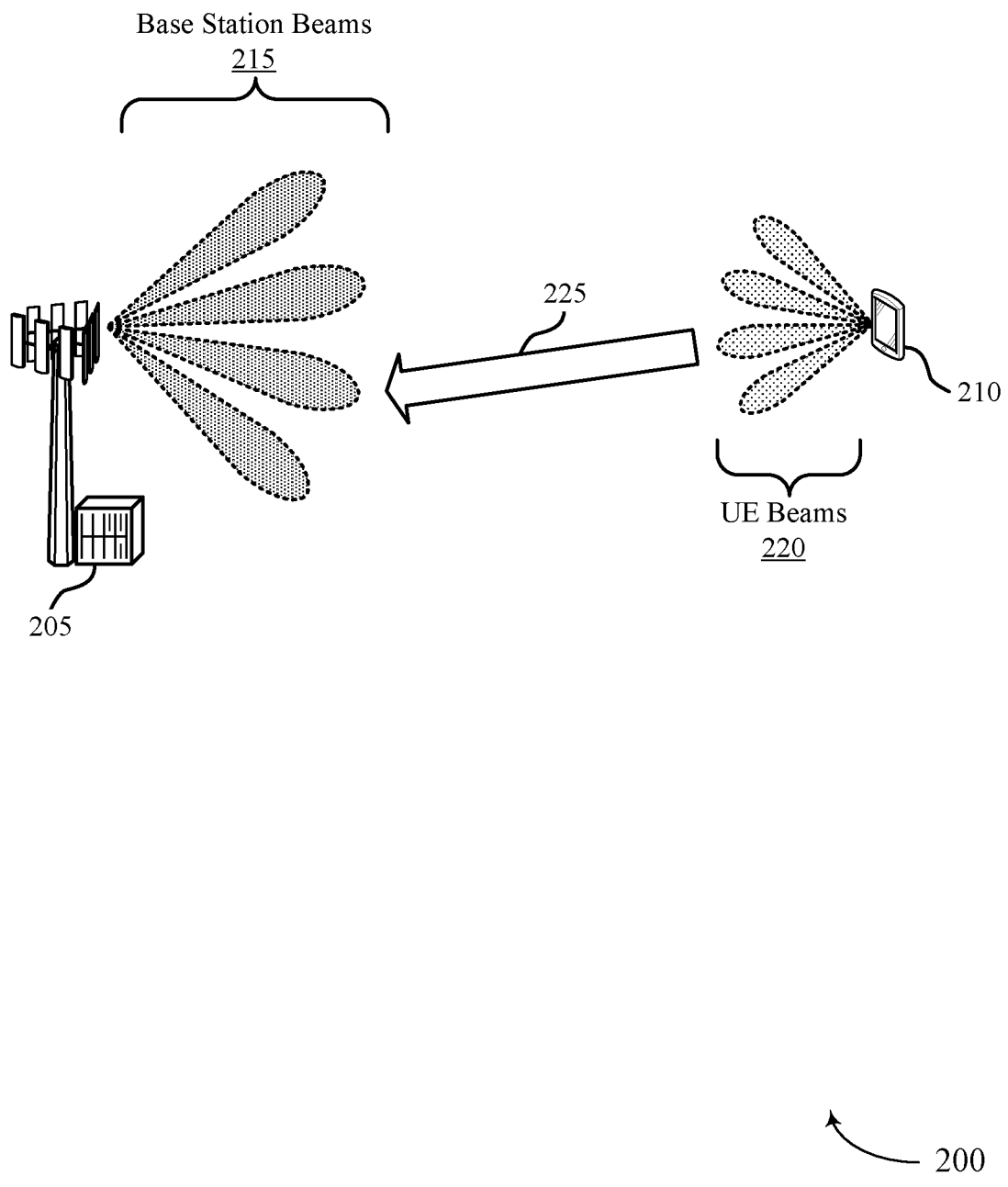

FIG. 2 illustrates an example of a wireless communications system 200 in accordance with aspects of the present disclosure. In some examples, wireless communications system 200 may implement aspects of wireless communications system 100.

The wireless communications system 200 may include a base station 205 and a UE 210. The base station 205 and UE 210 may be examples of aspects of a base station 105 and UE 115, respectively, as described with reference to FIG. 1. The base station 205 and UE 210 may operate in frequency ranges that are associated with beamformed transmissions between base station 205 and UE 210. For example, the base station 205 and UE 210 may operate using mmW frequency ranges. As a result, signal processing technologies, such as beamforming, may be used to coherently combine energy and overcome path losses. The base station 205 may communicate (transmit and/or receive) using the base station beams 215, and the UE 210 may communicate (transmit and/or receive) using the UE beams 220.

In wireless communications system 200, the base station 205 may perform a beam sweeping procedure to allow the UE 210 to discover beams (i.e., a combination of a base station beam 215 and a UE beam 220) that may be used for communication. In some cases, the beam for communication may be referred to as a beam pair or a transmit/receive beam pair. In some cases, the base station 205 may perform the beam sweeping procedure at a regular interval, e.g., every 20 milliseconds. The time periods during which the beam sweeping procedure is performed may be referred to as scheduled synchronization signal transmission times.

During each of the scheduled synchronization signal transmission times, the base station 205 may transmit synchronization signals on different base station beams 215 in a sequence of different directions (e.g., using a same beam width or different beam widths). In some examples, each of the scheduled synchronization signal transmission times may be a slot. Each scheduled synchronization signal transmission times may include a synchronization signal burst set (SSBS). In one example, an SSBS may include up to 64 synchronization signal blocks (SSBs). In other examples, an SSBS may include up to 16 SSBs, 32 SSBs, or some other number of SSBs supported by or configured for the wireless communications system 200. In some examples, the base station 205 may transmit synchronization signals on each of the base station beams 215 during each scheduled synchronization signal transmission times. For example, each base station beam 215 may correspond to a different one of the SSBs in the SSBS in a scheduled synchronization signal transmission times.

The scheduled synchronization signal transmission times may be allocated for different uses. For example, a first subset of the scheduled synchronization signal transmission times may be allocated for dynamic measurement. During dynamic measurement, the UE 210 may measure only a subset of the total base station beams 215. The beams may be selected from a set of candidate beams.

In some examples, the UE 210 may select one of the UE beams 220. Based on the selected UE receive beam 220, the UE may select one or more beams (corresponding to measuring one or more of the base station beams 215 using the selected UE receive beam 220). The UE 210 may then perform measurements during the SSBs corresponding to the selected beams and may refrain from performing measurements during other SSBs.

The UE 210 may select the beams based at least in part on a fairness metric. For example, the fairness metric may be a weighted fairness metric. In accordance with the weighted fairness metric, all beams may be guaranteed to be visited (i.e., measured) at least once in a given period. However, each of the beams may have a different priority. Based on the priorities, the beams may be measured one or more times during the period. For example, if the weight of beam A is 1, and the weight of beam B is 2, beam A may be measured once during the period while beam B may be measured twice during the period. The period may span one or more scheduled synchronization signal transmission times (e.g., one or more symbols, slots, subframes, etc.).

The UE 210 may select the beams based at least in part on a signal strength metric. For example, the UE 210 may store information about historic signal strength measurements. The UE 210 may give higher priority to beams that are stronger based on the historic strength measurements, such that these beams have a statistically greater likelihood of being measured in a given synchronization signal transmission time. In some examples, the UE 210 may consider historic signal strength measurements from a defined time period (e.g., the last n synchronization signal transmission times).

The UE 210 may select the beams based at least in part on a spatial metric. For example, the UE 210 may give higher priority to beams that are spatial neighbors to a current serving beam. In some examples, the UE 210 may select the beams based at least in part on a spatial distance between the selected beam and a current serving beam.

The UE 210 may select the beams based at least in part on a timing metric. For example, the UE 210 may give higher priority to beams that have a longer no visit time, i.e., beams that have gone the longest time without being measured by the UE 210.

In some examples, the UE 210 may select beams based at least in part on a priority set of candidate beams. For example, the UE 210 may identify a set of priority beams based at least in part on a set of priority criteria. The priority criteria may include, for example, a signal strength criteria, such that all beams that had a signal strength greater than a signal strength threshold (e.g., a pre-determined, semi-static, or dynamic signal strength threshold) may be included in the set of priority beams. The priority criteria may also include, for example, a current serving beam criteria, such that all current serving beams may be included in the set of priority beams.

The UE 210 may select beams for dynamic measurement such that all beams in the set of priority candidate beams is measured at least once during a search and measure period. The search and measure period may be determined based at least in part on the number of UE receive beams 220, the number of base station beams 215, the number of candidate beams in the set of candidate beams, hardware measurement capabilities, or some combination of these or similar criteria. The UE 210 may select the beams using any combination of the techniques described herein.

In some examples, the UE 210 may select no beams for dynamic measurement during a scheduled synchronization signal transmission time. Such a scenario may result from the need to balance performance and battery consumption.

A second subset of the scheduled synchronization signal transmission times may be allocated for static measurement. During static measurement, the UE 210 may perform a beam sweeping procedure to discover new base station beams 215 from different cells across different component carriers. In some examples, the UE 210 may measure some or all of the discovered base station beams 215 based, for example, on hardware measure capabilities of the UE 210. The beams discovered during the beam sweeping procedure may be used to create or update the list of candidate beams that may be selected during dynamic measurement.

The UE 210 may report information about the selected beams to the base station 205 in an uplink transmission 225. This uplink transmission 225 may include a measurement report corresponding to a measurement procedure for one or more selected beams. The measurement report may include any number of parameters or values determined for the one or more selected beams. In some cases, based on the measurement report, the base station 205 and UE 210 may select a beam for communication (e.g., a downlink transmit base station beam 215 and downlink receive UE beam 220, an uplink transmit UE beam 220 and uplink receive base station beam 215, or some combination of these), and may perform additional communications using the selected serving beam. Further scheduled synchronization signal transmission times may be used to update or refine the selected beam for maintaining reliable communication between the base station 205 and UE 210.

Figure 3:
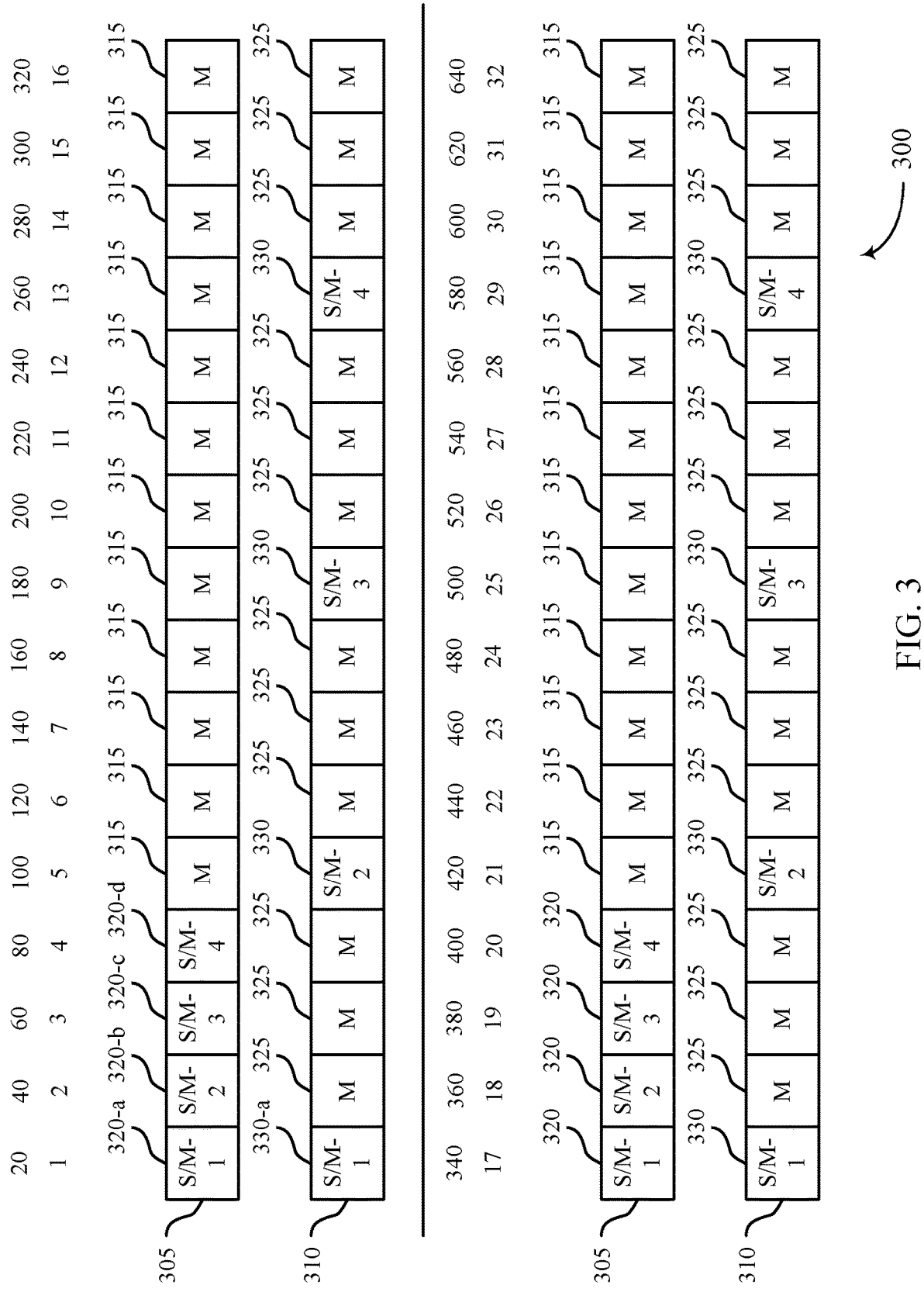
FIG. 3 illustrates an example of a scheduled synchronization signal transmission time sequence in a wireless communications system in accordance with aspects of the present disclosure.

FIG. 3 illustrates an example of a scheduled synchronization signal transmission time sequence 300 in a wireless communications system in accordance with aspects of the present disclosure. In some examples, the wireless communication system may implement aspects of wireless communications system 100 or 200.

A base station (such as base station 205 described with reference to FIG. 2) may perform a beam sweeping procedure at regular intervals (e.g., every 20 milliseconds). A UE (such as UE 210 described with reference to FIG. 2) may determine a set of synchronization signal transmission times. In some examples, the set of synchronization signal transmission times may be determined based at least in part on a search and measure period, which may be determined based at least in part on a number of candidate beams, a hardware measure capability, or a combination thereof. In the scheduled synchronization signal transmission time sequence 300, the search and measure period (and the set of synchronization signal transmission times) includes sixteen synchronization signal transmission times, with each synchronization signal transmission time separated by 20 milliseconds.

The sixteen synchronization signal transmission times may be divided into a first subset and a second subset. The first subset of synchronization signal transmission times may be allocated for dynamic measurement, and the second subset of synchronization signal transmission times may be allocated for static measurement. In some examples, the first subset and the second subset may be defined and allocated according to a technical standard. In some other examples, the first subset and the second subset may be defined and allocated based at least in part on signaling from a base station. In some other examples, the first subset and the second subset may be defined and allocated by the UE.

The scheduled synchronization signal transmission time sequence 300 includes a first sequence 305 and a second sequence 310. In the first sequence 305, the first subset includes dynamic transmission times 315, and the second subset includes static transmission times 320. In the second sequence, the first subset includes dynamic transmission times 325, and the second subset includes static transmission times 330.

In the first sequence 305, the initial synchronization signal transmission times may be allocated for static scheduling based at least in part on a number of available UE receive beams. For example, when the UE has four UE receive beams, the first four synchronization signal transmission times may be allocated for static scheduling, as shown in the first sequence 305. Each of the static transmission times 320 may be used to perform a search and measure (beam discovery) procedure to identify candidate beams. For example, the UE may perform a first search and measure (S/M-1) procedure in the first static transmission time 320-*a* using a first UE receive beam, perform a second search and measure (S/M-2) procedure in the second static transmission time 320-*b* using a second UE receive beam, perform a third search and measure (S/M-3) procedure in the third static transmission time 320-*c* using a third UE receive beam, and perform a fourth search and measure (S/M-4) procedure in the fourth static transmission time 320-*d* using a fourth UE receive beam. During the search procedure, the UE may discover new base station beams (e.g., base stations beams that were previously not identified by the UE) from different cells across different component carriers. During the measure procedure, the UE may measure some or all of the discovered beams (e.g., based on processing capabilities of the UE). Prior to the start of the fifth synchronization signal transmission time, the UE may compile a set of candidate beams based on the beams discovered during the four search and measure procedures.

In some examples, the UE may also measure one or more of the discovered beams during the search and measure procedures. The UE may determine whether or how many of the discovered beams to measure based at least in part on a hardware measure capability.

In the first sequence 305, the remaining synchronization signal transmission times in each search and measure period may be used for dynamic measurement. In each of the dynamic transmission times 315, the UE may select one or more beams for measurement, or may determine not to perform any measurements during the dynamic transmission time 315. The UE may select one or more beams from the set of candidate beams identified during the static transmission times 320. The UE may select the beams based at least in part on a metric function and/or a selection algorithm. In some cases, selecting the beams may additionally include dynamically selecting one or more component carriers, cells, or both for measurement. For example, the number of component carriers, the number of cells, or both that can be measured by the UE per scheduling opportunity may be limited (e.g., fixed within one SSBS). As such, dynamically selecting the beams for measurement may involve the UE dynamically selecting the base station beams, UE beams, cells, and component carriers for the selected beams.

In some examples, the UE may use two-step scheduling to select the beams for each dynamic transmission time. The UE may first select one or more of the available UE receive beams (e.g., one of the first through fourth UE receive beams used during the static transmission times 320). The UE may then select one or more beams corresponding to the selected UE receive beam(s). For example, the UE may identify fifteen beams during the first static transmission time 320-*a*, during which a search and measure procedure was performed using a first UE receive beam. Accordingly, each of the fifteen beams represents a combination of the first UE receive beam and a base station transmit beam. During one of the dynamic transmission times 315, the UE may select the first UE receive beam. The UE may then select one or more of the fifteen beams for measurement during the dynamic transmission time 315 (based, e.g., on the metric function and/or the selection algorithm).

In some examples, the UE may select candidate beams for measurement based at least in part on a fairness metric, a signal strength metric, a spatial metric, a time metric, or a combination thereof. For example, the UE may select candidate beams based at least in part on a weighted fairness metric. In another example, the UE may store information about historic signal strength measurements and may select candidate beams based at least in part on historical signal strength measurements (e.g., signal strength measurements during the most recent n transmission times). In yet another example, the UE may select the beams based at least in part on a spatial distance between the beam and a current serving beam (e.g., by giving higher priority to beams that are spatial neighbors to a current serving beam). In a further example, the UE may select the beams based at least in part on an amount of time since the beam was last measured (a no visit time), such that beams with longer no visit times have higher priority than beams with lower no visit times.

In some examples, the UE may compile a priority beam set, which may be a subset of the candidate beam set. For example, the priority beam set may include all current serving beams. The priority beam set may also include all candidate beams with a signal strength above a signal strength threshold, according to a most recent measurement. The priority beam set may also include other beams that satisfy one or more priority criteria.

The UE may select candidate beams for measurement during the dynamic transmission times 315 such that each beam in the priority beam set may be measured at least once during the search and measure period (i.e., at least once in the dynamic transmission times 315 in any of the fifth through sixteenth scheduled synchronization signal transmission times).

The UE may operate in a periodic fashion. For example, after the sixteenth scheduled synchronization signal transmission time, the UE may start a new search and measure period by discovering beams in four static transmission times 320. In other examples, the UE may operate according to other periodicities (e.g., thirty-two scheduled synchronization signal transmission times, sixty-four scheduled synchronization signal transmission times, etc.).

In the second sequence 310, the static transmission times 330 may be evenly spaced throughout the search and measure period based at least in part on a number of available UE receive beams. For example, for a UE with four available receive beams, the static transmission times 330 may be located in the first, fifth, ninth, and thirteenth schedule synchronization signal transmission times. In other examples, the static transmission times 330 may be located in other locations with either regular, irregular, or no spacing between each static transmission time.

In some examples, the first search and measure period of the second sequence 310 may represent an initial search and measure period (e.g., the UE may not have performed any previous measurements). Thus, the UE may perform a first search and measure procedure (S/M-1) during the first static transmission time 330-a and may create a candidate beam set based on beams discovered during the first search and measure procedure. The UE may add other beams discovered as a result of the remaining three search and measure procedures, such that the UE may not have a complete set of candidate beams from which it may select until the fourteenth scheduled synchronization signal transmission time. During the second search and measure period (starting at the seventeenth scheduled synchronization signal transmission time), the UE may update the list of candidate beams. Accordingly, during the twenty-second scheduled synchronization signal transmission time, the UE may dynamically select from a list of candidate beams discovered during the search and measure procedures in the ninth and thirteenth scheduled synchronization signal transmission times of the first search and measure period and the seventeenth and twenty-first scheduled synchronization signal transmission times of the second search and measure period.

In the second sequence 310, the three synchronization signal transmission times after each static transmission time 330 may be used for dynamic measurement. During the dynamic transmission times 325, the UE may select one or more candidate beams for measurement as discussed above with respect to the first sequence 305 (e.g., from a current set of beams based on previous search and measure periods).

Figure 4:
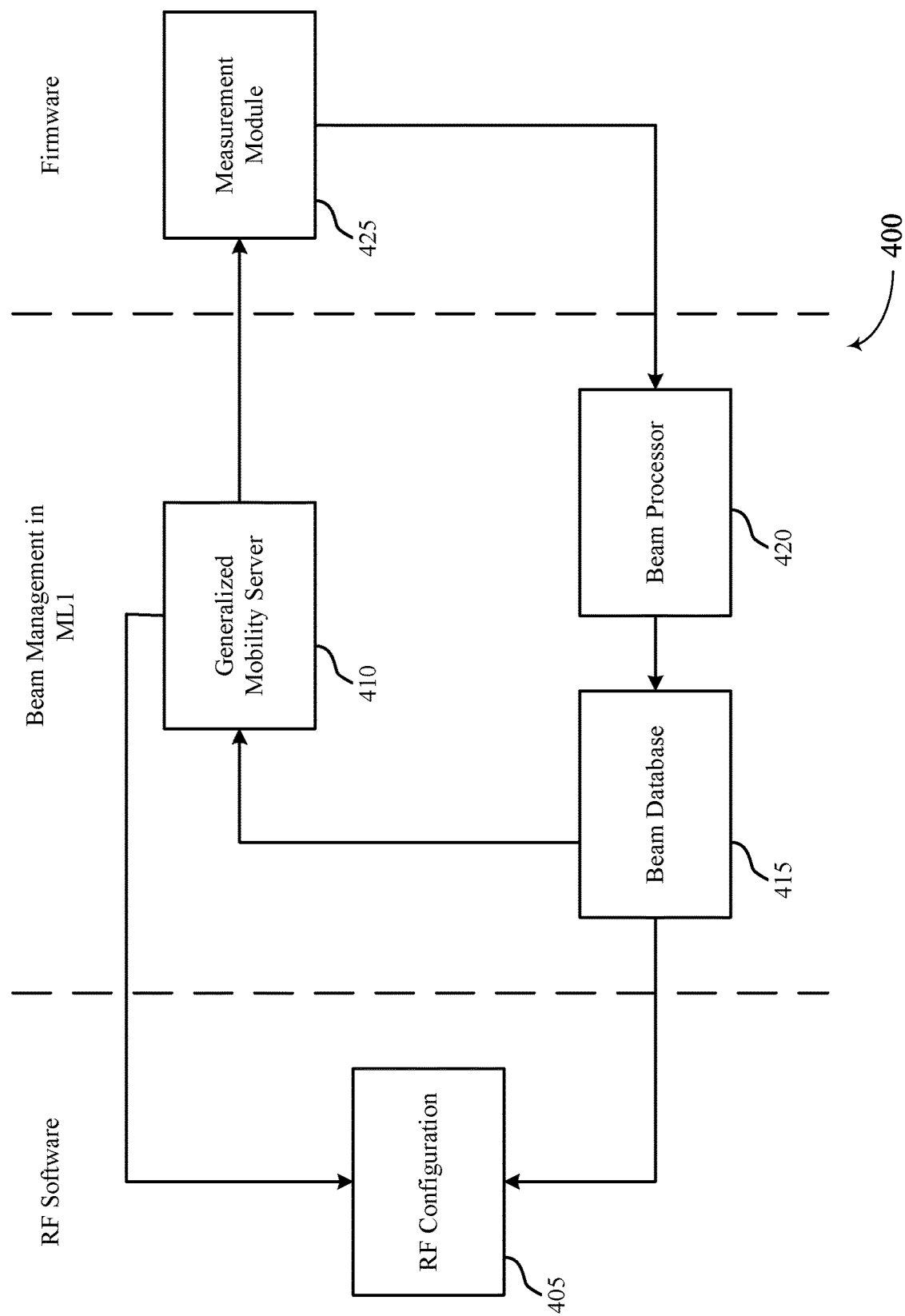
FIG. 4 illustrates an example of a wireless device in accordance with aspects of the present disclosure.

FIG. 4 illustrates an example of a wireless device 400 in accordance with aspects of the present disclosure. In some examples, wireless device 400 may be an example of aspects of UE 115 and/or UE 210 described with reference to FIGS. 1 and 2.

The wireless device 400 may include a radio frequency (RF) configuration module 405, which may be implemented in RF software. The RF configuration module 405 may control the antennas of the wireless device 400 to cause the wireless device 400 to receive and/or transmit using one of a number of available UE beams.

The wireless device may also include beam management modules, including a generalized mobility server (GMS) 410, a beam database 415, and a beam metric processor 420. The GMS 410 may control the operations of the wireless device 400 during a scheduled synchronization signal transmission time. For example, the GMS 410 may indicate to the RF configuration module which beam to measure (i.e., which UE receive beam to use) during a scheduled synchronization signal transmission time. The GMS 410 may also indicate to a measurement module 425 in firmware which beams to search and measure (i.e., which base station transmit beams to search and measure) during a scheduled synchronization signal transmission time. The GMS 410 may take as input information stored in a beam database 415.

The beam database 415 may store various information related to the beam management procedure. For example, the beam database 415 may store a set of candidate beams discovered during a beam discovery procedure. The beam database 415 may also store signal strength measurements for the discovered beams. In some examples, the beam database 415 may store both current and historical signal strength measurements (e.g., where the historical signal strength measurements may be flushed in a first in-first out manner). The beam database 415 may also store information about which beams are current serving beams.

The measurement module 425 may receive search and measurement results during scheduled synchronization signal transmission times. The measurement module 425 may provide the information to the beam metric processor 420 for processing. For example, the beam metric processor 420 may filter and/or collapse the information received from the measurement module 425 and may provide the processed information to the beam database 415 so that the information in the database may be updated.

The GMS 410 may determine a set of scheduled synchronization signal transmission times. The set of scheduled synchronization signal transmission times may be pre-defined (e.g., by a technical standard) or may be indicated in signaling from a base station. In some examples, the set of scheduled synchronization signal transmission times may be based at least in part on a number of candidate beams, hardware measure capability of the wireless device 400, or a combination thereof. A first subset of the set of scheduled synchronization signal transmission times may be allocated for dynamic measurement. A second subset of the scheduled synchronization signal transmission times may be allocated for static measurement.

During a scheduled synchronization signal transmission time in the second subset (i.e., a scheduled synchronization signal transmission time allocated for static transmission), the GMS 410 may select a UE receive beam (e.g., UE receive beam A) for use during that synchronization signal transmission time. The GMS 410 may send instructions to the RF configuration module 405 to cause the antennas of the wireless device 400 to be configured in accordance with UE receive beam A. The GMS 410 may also send instructions to the measurement module 425 to cause the wireless device 400 to discover beams associated with the UE receive beam A. In some examples, the GMS 410 may also send instructions to the measurement module 425 to measure some or all of the discovered beams, e.g., based at least in part on a hardware measure capability of the wireless device 400.

The measurement module 425 may report the discovered beams and, where applicable, the associated measurements to the beam database 415 via the beam metric processor 420. The beam database 415 may thus be updated to create or supplement a list of candidate beams. In some examples, the beam database 415 may also select a new serving beam pair and update the RF configuration module 405 accordingly.

During a scheduled synchronization signal transmission time in the first subset (i.e., a scheduled synchronization signal transmission time allocated for dynamic transmission), the GMS 410 may determine whether to measure one or more beams from a set of candidate beams. The set of candidate beams may be obtained from the beam database 415, e.g., based at least in part on the beams discovered during static measurement. The GMS 410 may make this determination based at least in part on a metric function and/or a selection algorithm.

In some examples, the GMS 410 may use two-step scheduling to select the beams for each dynamic transmission times. The GMS 410 may first select one of the available UE transmission beams (e.g., UE receive beam B). The GMS 410 may send instructions to the RF configuration module 405 to cause the antennas of the wireless device 400 to be configured in accordance with UE receive beam B. After selecting the UE transmission beam, the GMS 410 may then select one or more beams corresponding to the selected UE receive beam. For example, the GMS 410 may identify fifteen beams corresponding to UE receive beam B during a static transmission time. The GMS 410 may select one or more of the fifteen beams for measurement during the dynamic transmission time. The GMS 410 may send instructions to the measurement module 425 to measure the selected one or more of the fifteen beams. In some examples, the GMS 410 may determine not to perform any measurements during the dynamic transmission time and may accordingly refrain from providing measurement instructions to the measurement module 425.

In some examples, the GMS 410 may select candidate beams for measurement based at least in part on a fairness metric, a signal strength metric, a spatial metric, a time metric, or a combination thereof. For example, the GMS 410 may select candidate beams based at least in part on a weighted fairness metric. In another example, the beam database 415 may store information about historic signal strength measurements, and the GMS 410 may select candidate beams based at least in part on historical signal strength measurements (e.g., signal strength measurements during the most recent n transmission times). In yet another example, the GMS 410 may select the beams based at least in part on a spatial distance between the beam and a current serving beam (e.g., by giving higher priority to beams that are spatial neighbors to a current serving beam). In a further example, the GMS 410 may select the beams based at least in part on an amount of time since the beam was last measured (a no visit time), such that beams with longer no visit times have higher priority than beams with lower no visit times.

In some examples, the beam database 415 may compile a priority beam set, which may be a subset of the candidate beam set. For example, the priority beam set may include all current serving beams. The priority beam set may also include all candidate beams with a signal strength above a signal strength threshold, according to a most recent measurement. The priority beam set may also include other beams that satisfy one or more priority criteria.

The GMS 410 may select candidate beams for measurement during the dynamic transmission times such that each beam in the priority beam set may be measured at least once during the search and measure period.

The GMS 410 may be able to handle various hardware and/or software constraints or specification requirements on different targets. In some examples, the GMS 410 may be able to measure up to a certain number of beams during each measure duration (which may be a TTI, an SSBS, or the like). In some examples, the GMS 410 may be able to maintain the periodicity of the serving beam in the serving cell. In some examples, the GMS 410 may be able to grant more scheduling opportunities to a serving cell than to neighboring cells. In some examples, the GMS 410 may limit the number of component carriers that can be measured per scheduling opportunity. In some examples, the GMS 410 may fix mapping between the number of component carriers and the component carriers within one SSBS. In some examples, the GMS 410 may limit the number of cells that can be measured per scheduling opportunity.

Figure 5:
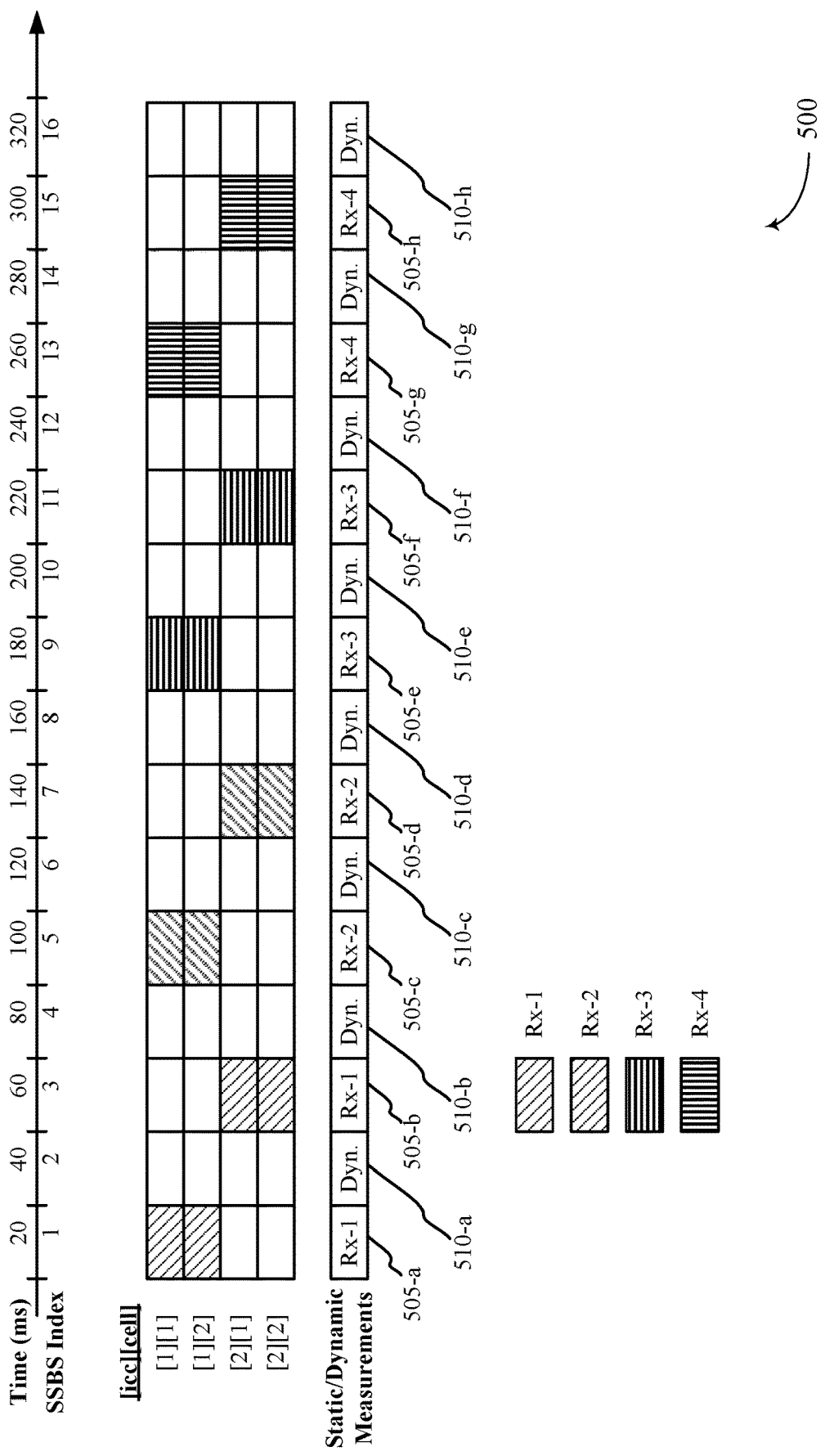
FIG. 5 illustrates an example of a scheduled synchronization signal transmission time sequence in a wireless communications system in accordance with aspects of the present disclosure.

FIG. 5 illustrates an example of a scheduled synchronization signal transmission time sequence 500 in a wireless communications system in accordance with aspects of the present disclosure. In some examples, the wireless communication system may implement aspects of wireless communications system 100 or 200.

The wireless communication system may include a base station and a UE, which may be examples of the wireless devices described with reference to FIGS. 1 through 4. The wireless communication system may include two cells and two component carriers. The UE may have four PO receive beams. Due to hardware capability limitations of the UE, the UE may be able to measure two beams in each SSBS. The search and measure period in the scheduled synchronization signal transmission time sequence 500 may be 320 milliseconds (e.g., 16 SSBSs). Due to the length of the search and measure period, the maximum size of a priority candidate beam set may be 16.

The scheduled synchronization signal transmission time sequence 500 may be divided into a first subset of scheduled synchronization signal transmission times allocated for dynamic measurement and a second subset of scheduled synchronization signal transmission times allocated for static measurements.

The second subset of scheduled synchronization signal transmission times may include the static measurement times 505 that are scheduled in every other scheduled synchronization signal transmission time. For example, beam discovery processes may be performed using the first receive beam during the first two static measurement times 505-a and 505-b, beam discovery processes may be performed using the second receive beam during the next two static measurement times 505-c and 505-d, beam discovery processes may be performed using the third receive beam during the next two static measurement times 505-e and 505-f, and beam discovery processes may be performed using the fourth receive beam during the final two static measurement times 505-g and 505-h. The base station may also perform measurements during the static measurement times 505-a through 505-h. However, based on hardware limitations, the UE may perform measurements on a subset of the discovered beams. For example, the UE may perform measurements using two combinations of component carrier and cell, for example, component carrier 1 on cell 1 and component carrier 1 on cell 2 (e.g., where the component carrier and cell are parameters for a dynamically scheduled beam). Different combinations of component carrier and cell (e.g., component carrier 2 on cell 1 and component carrier 2 on cell 2) may be measured in the different static measurement times 505-a and 505-b corresponding to the first receive beam.

The remaining scheduled synchronization signal transmission times during the search and measurement periods may be dynamic measurement times 510-a through 510-h, e.g., scheduled synchronization signal transmission times allocated for dynamic measurement. During each of the dynamic measurement times 510-a through 510-h, the UE may identify one or more beams for measurement as described above with respect to FIGS. 2 through 4.

In some examples, the UE may select one or more beams for measurement based on a generalized mobility metric function $f_{GM}$, which may be implemented by a weighted counter:

$$f_{GM} = \frac{c_{[icc][icell][itx][irx]}}{w_{[icc][icell][itx][irx]}} \quad (1)$$

where w is a prioritized weight for a beam and c is a counter for a beam that increments by 1 after each measurement on the beam. The metric function of Equation 1 may be initialized by obtaining measured values for each beam [icc][icell][itx][irx] from a database. The counter c for all beams may be reset to 1. The metric function of Equation 1 may then be calculated for each beam [icc][icell][itx][irx], and the calculated value may be stored in a database, e.g., shown in Table 1.

TABLE 1

| [icc][icell]/[irx] | PO Rx1 | PO Rx2 | PO Rx3 | PO Rx4 |
|---|---|---|---|---|
| [1][1] | 1/3 | 1/3 | 1/3 | 1/3 |
| [1][2] | 1/2 | 1 | 1/3 | 1/3 |
| [2][1] | 1 | 1/2 | 1 | 1 |
| [2][2] | 1/2 | 1/2 | 1 | 1 |

During each dynamic measurement time 510-a through 510-h, the UE may select one or more beams for measurement based at least in part on the metric function. In some examples, the UE may select one or more beams for each SSBS. For example, for a given base station transmission beam (corresponding to the SSBS), the UE may determine a minimum value of the metric function for all combinations of component carrier and cell. The UE may then select a receive beam based at least in part on the minimum values. The UE may then rank the combinations of component carrier and cell based on the metric function. The UE may then measure a number of the top ranked beams (e.g., the top two) and may update the counter c for the beams that are measured.

For example, Table 1 may represent the values of the metric function at the beginning of the scheduled synchronization signal transmission time sequence (e.g., based on measurements during a previous time period). During a first dynamic measurement time 510-a, the UE may review Table 1 to identify minimum metric function values. Each of receive beams 2, 3, and 4 may have a minimum value of 1/3. The minimum value for receive beam 1 may have changed based on the measurements during the first static measurement time 505-a, e.g., due to an increase in the counter c and/or an increase in the weight w, but may be no less than 1/3. Receive beam 2 may be selected because it has the lowest minimum value, even if it may be tied with at least receive beams 3 and 4. In some examples, receive beam 2 may be selected based at least in part on an average value or a next lowest value.

The UE may then rank the beams in reverse order of the metric function. Based on Table 1 (f=1/3), the UE may rank beam [1][1] the highest, beams [2][1] and [2][2] the next highest (f=1/2), and beam [1][2] the lowest (f=1). The UE may select the two highest beams for measurement (e.g., beams [1][1] and [2][1]). The UE may accordingly measure beams [1][1] and [2][1], and may update the metric functions for the measured beams based at least in part on an increase in the counter c and/or a change in the weight w. The same process may be used during each dynamic measurement time 510-a through 510-h to select beams for measurement. In some examples, the UE may refrain from performing any measurements during a dynamic measurement time 510-a through 510-h unless a metric function is below a certain threshold value (e.g., a pre-configured threshold value at the UE, a threshold value configured by a base station, or a dynamic threshold value based on one or more parameters, such as channel quality or serving beam parameters).

Figure 6:
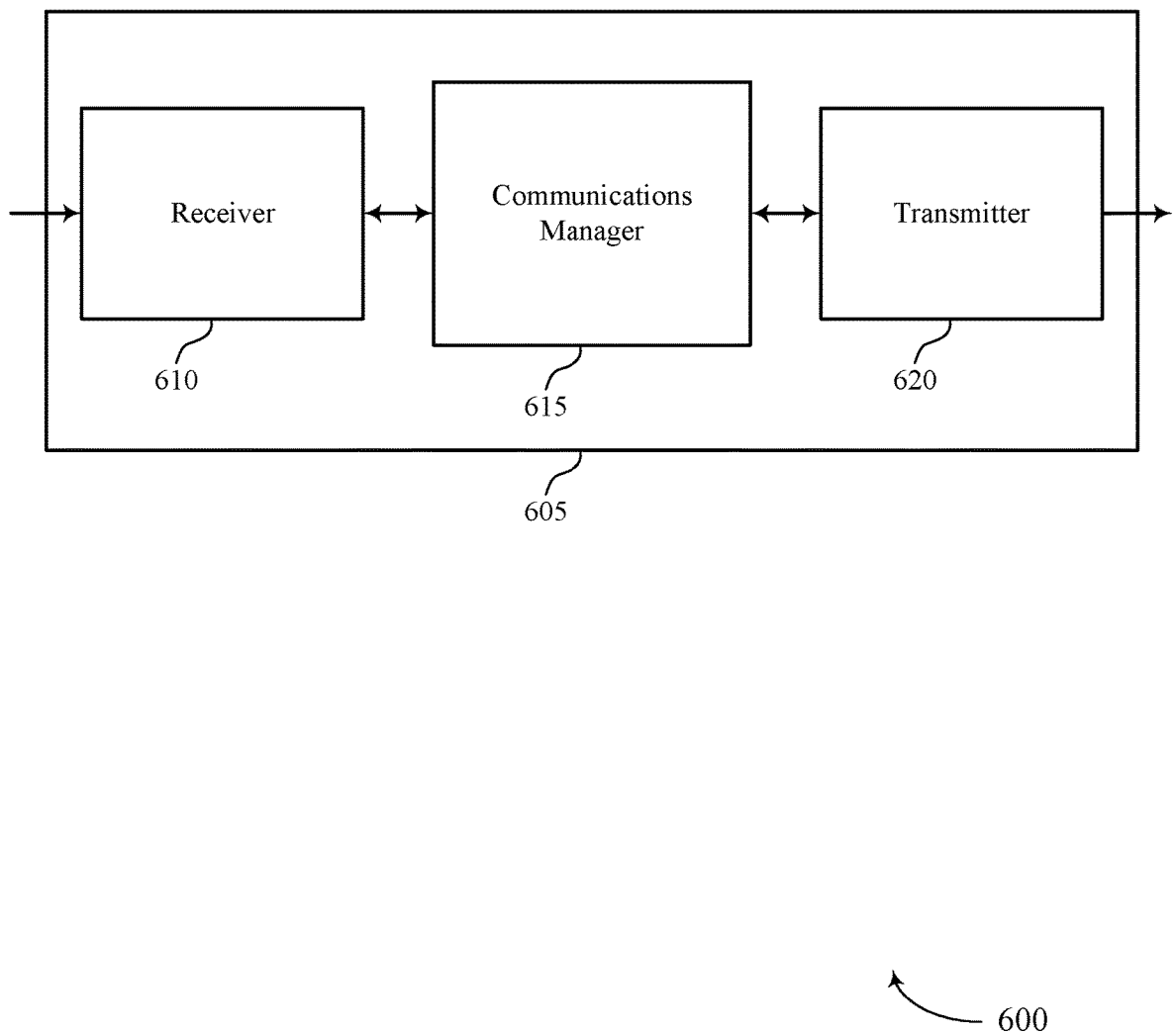
FIGS. 6 and 7 show block diagrams of wireless devices in accordance with aspects of the present disclosure.

FIG. 6 shows a block diagram 600 of a wireless device 605 in accordance with aspects of the present disclosure. Wireless device 605 may be an example of aspects of a UE 115 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, information related to mobility scheduling, etc.). Information may be passed on to other components of the device. The receiver 610 may be an example of aspects of the transceiver 935 described with reference to FIG. 9. The receiver 610 may utilize a single antenna or a set of antennas.

Communications manager 615 may be an example of aspects of the communications manager 915 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Communications manager 615 may determine a set of scheduled synchronization signal transmission times, select at least one candidate beam from a set of candidate beams for a dynamic measurement during one of a first subset of the set of scheduled synchronization signal transmission times, where the first subset of the set of scheduled synchronization signal transmission times is allocated for dynamic measurement, perform a measure procedure on the at least one candidate beam during the one of the first subset of scheduled synchronization signal transmission times, and transmit at least one measurement report corresponding to the measure procedure performed on the at least one candidate beam.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
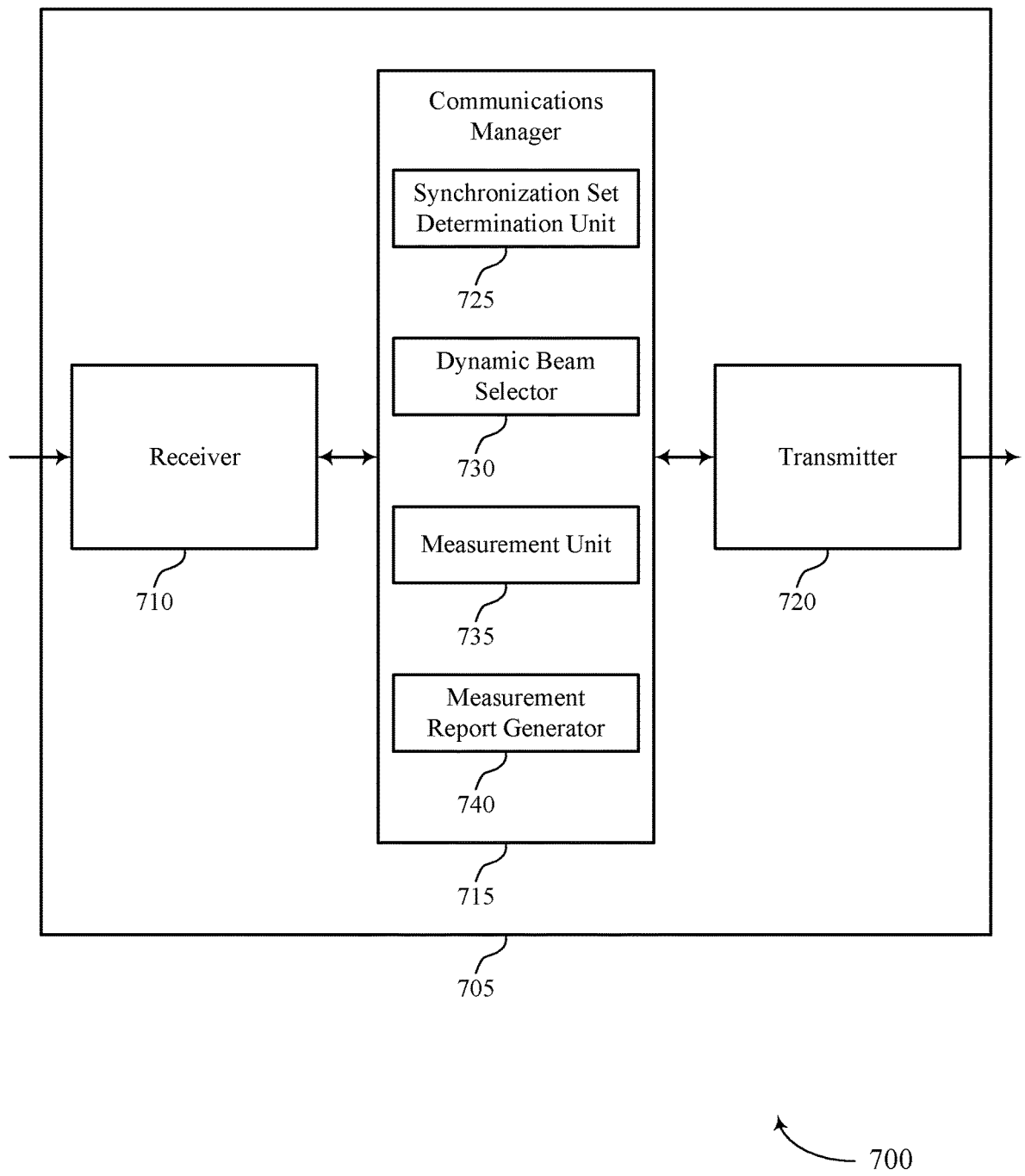

FIG. 7 shows a block diagram 700 of a wireless device 705 in accordance with aspects of the present disclosure. Wireless device 705 may be an example of aspects of a wireless device 605 or a UE 115 as described with reference to FIG. 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, etc.). Information may be passed on to other components of the device. The receiver 710 may be an example of aspects of the transceiver 935 described with reference to FIG. 9. The receiver 710 may utilize a single antenna or a set of antennas.

Communications manager 715 may be an example of aspects of the communications manager 915 described with reference to FIG. 9. Communications manager 715 may also include synchronization set determination unit 725, dynamic beam selector 730, measurement unit 735, and measurement report generator 740.

Synchronization set determination unit 725 may determine a set of scheduled synchronization signal transmission times. In some cases, the set of scheduled synchronization signal transmission times is determined based on a search and measure period.

Dynamic beam selector 730 may select at least one candidate beam from a set of candidate beams for a dynamic measurement during one of a first subset of the set of scheduled synchronization signal transmission times, where the first subset of the set of scheduled synchronization signal transmission times is allocated for dynamic measurement. In some cases, the at least one candidate beam is selected from the set of candidate beams based on a fairness metric, a signal strength metric, a spatial metric, a timing metric, or a combination thereof. In some cases, the fairness metric includes a weighted fairness metric. In some cases, the signal strength metric includes a signal strength based on historical measurements. In some cases, the spatial metric includes a spatial distance from a serving beam. In some cases, the timing metric includes a no visit time.

Measurement unit 735 may perform a measure procedure on the at least one candidate beam during the one of the first subset of scheduled synchronization signal transmission times. In some cases, measurement unit 735 may perform the measure procedure on each of a set of priority candidate beams at least once during the search and measure period. Additionally or alternatively, measurement unit 735 may perform a measure procedure on at least one beam identified during a beam sweep procedure during a second subset of scheduled signal transmission times.

Measurement report generator 740 may transmit at least one measurement report corresponding to the measure procedure performed on the at least one candidate beam.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
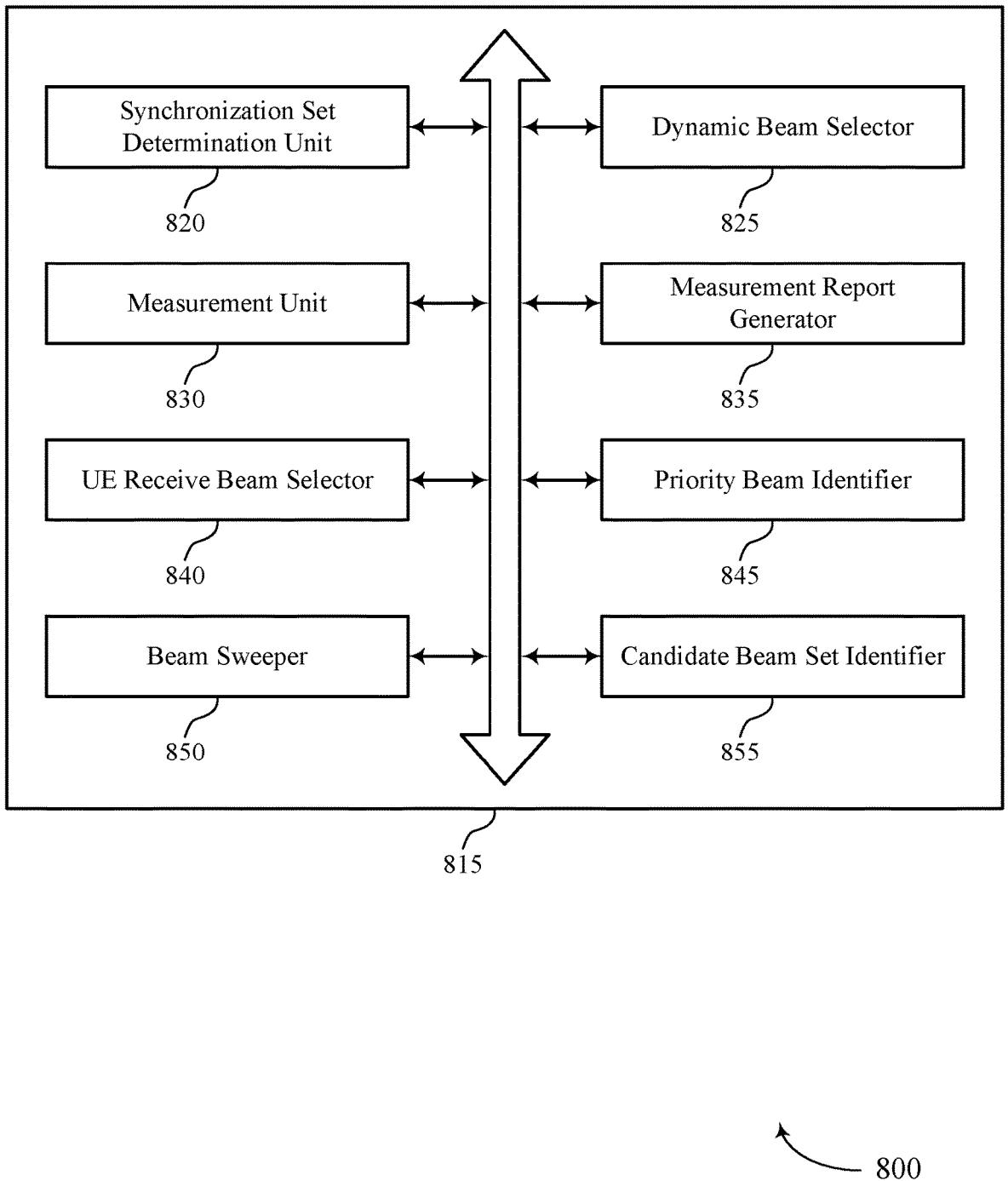
FIG. 8 shows a block diagram of a communications manager in accordance with aspects of the present disclosure.

FIG. 8 shows a block diagram 800 of a communications manager 815 in accordance with aspects of the present disclosure. The communications manager 815 may be an example of aspects of a communications manager 615, a communications manager 715, or a communications manager 915 described with reference to FIGS. 6, 7, and 9. The communications manager 815 may include synchronization set determination unit 820, dynamic beam selector 825, measurement unit 830, measurement report generator 835, UE receive beam selector 840, priority beam identifier 845, beam sweeper 850, and candidate beam set identifier 855. Each of these modules may communicate, directly or indirectly, with one another (e.g., via one or more buses).

Synchronization set determination unit 820 may determine a set of scheduled synchronization signal transmission times. In some cases, the set of scheduled synchronization signal transmission times is determined based on a search and measure period.

Dynamic beam selector 825 may select at least one candidate beam from a set of candidate beams for a dynamic measurement during one of a first subset of the set of scheduled synchronization signal transmission times, where the first subset of the set of scheduled synchronization signal transmission times is allocated for dynamic measurement. In some cases, the at least one candidate beam is selected from the set of candidate beams based on a fairness metric, a signal strength metric, a spatial metric, a timing metric, or a combination thereof. In some cases, the fairness metric includes a weighted fairness metric. In some cases, the signal strength metric includes a signal strength based on historical measurements. In some cases, the spatial metric includes a spatial distance from a serving beam. In some cases, the timing metric includes a no visit time.

Measurement unit 830 may perform a measure procedure on the at least one candidate beam during the one of the first subset of scheduled synchronization signal transmission times. Measurement report generator 835 may transmit at least one measurement report corresponding to the measure procedure performed on the at least one candidate beam.

In some examples, performing the measure procedure may involve UE receive beam selector 840 selecting a UE receive beam for the one of the first subset of scheduled synchronization signal transmission times. In these examples, dynamic beam selector 825 may select the at least one candidate beam from a subset of the set of candidate beams corresponding to the selected UE receive beam.

In some examples, performing the measure procedure may involve priority beam identifier 845 identifying a set of priority candidate beams from the set of candidate beams and measurement unit 830 performing the measure procedure on each of the set of priority candidate beams at least once during the search and measure period.

Beam sweeper 850 may perform a beam sweep procedure for each of a set of UE receive beams during a second subset of the set of scheduled synchronization signal transmission times (e.g., where the second subset is different than the first subset), where the second subset of the set of scheduled synchronization signal transmission times is allocated for static measurement based on a number of UE receive beams in the set of UE receive beams. Measurement unit 830 may perform an additional measure procedure on at least one beam identified based on the beam sweep procedure during the second subset of the set of scheduled synchronization signal transmission times. Candidate beam set identifier 855 may determine a set of candidate beams based on the beam sweep procedure for each of the set of UE receive beams.

Figure 9:
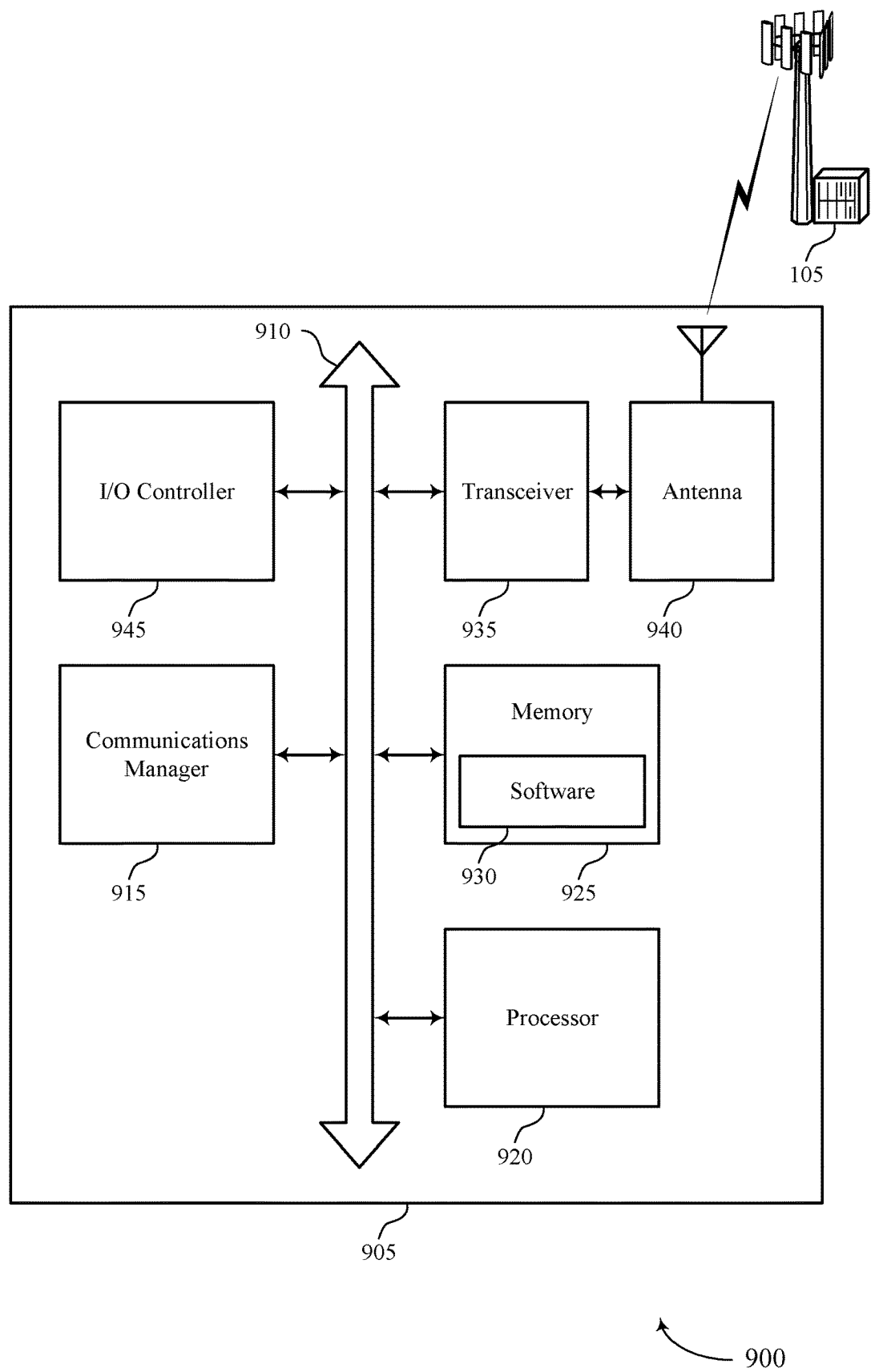
FIG. 9 shows a diagram of a system including a device in accordance with aspects of the present disclosure.

FIG. 9 shows a diagram of a system 900 including a device 905 in accordance with aspects of the present disclosure. Device 905 may be an example of or include the components of wireless device 605, wireless device 705, or a UE 115 as described herein, e.g., with reference to FIGS. 1 through 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Communications manager 915 may perform one or more of the functions described with reference to communications manager 615, communications manager 715, or communications manager 815 discussed herein with regard to FIGS. 6 through 8.

Processor 920 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting a generalized mobility scheduling framework).

Memory 925 may include random access memory (RAM) and read-only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support generalized mobility scheduling framework. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
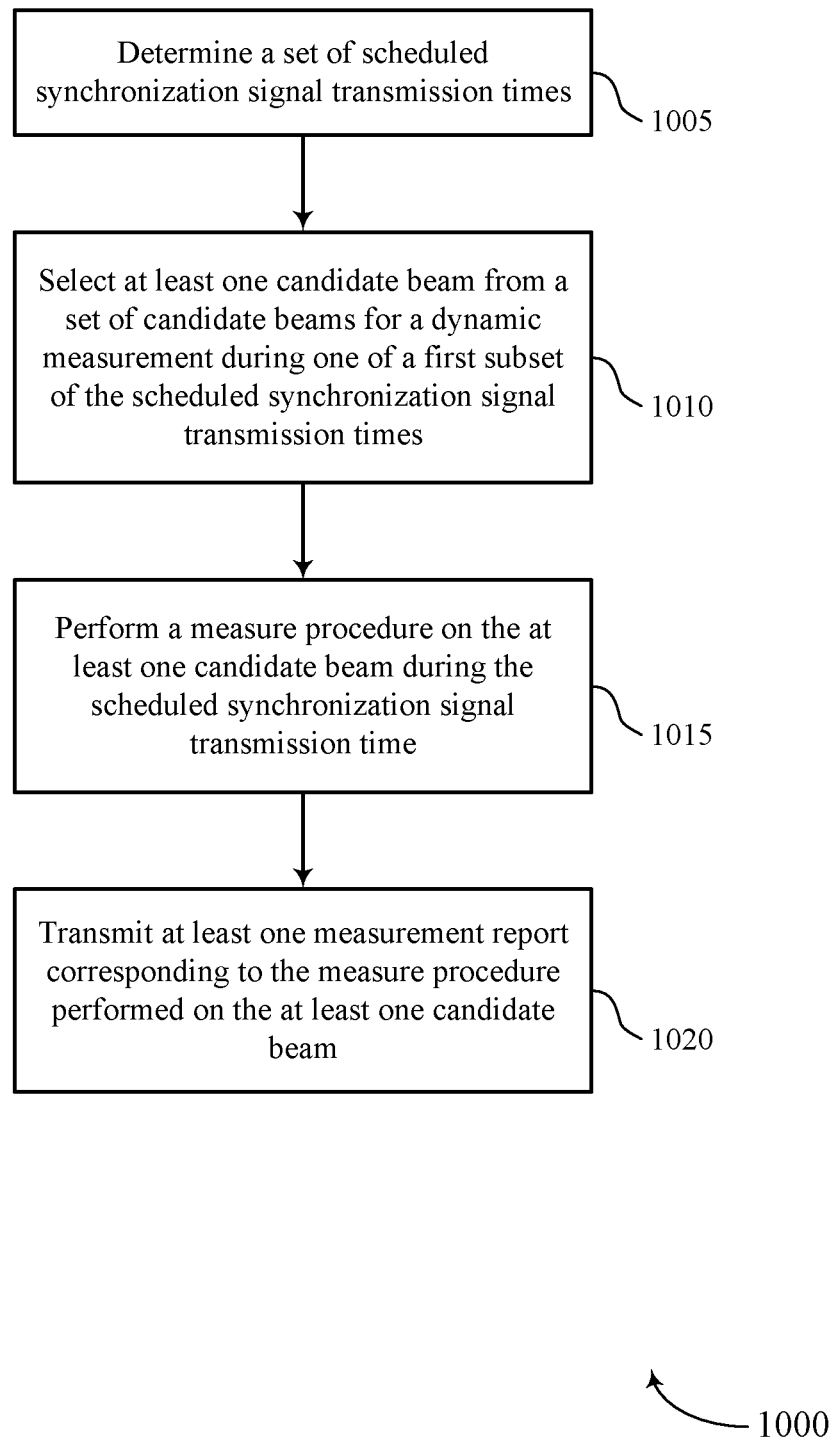
FIG. 10 shows a flowchart illustrating a method in accordance with aspects of the present disclosure.

FIG. 10 shows a flowchart illustrating a method 1000 in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1005 the UE 115 may determine a set of scheduled synchronization signal transmission times. The operations of 1005 may be performed according to the methods described herein. In certain examples, aspects of the operations of 1005 may be performed by a synchronization set determination unit as described with reference to FIGS. 6 through 9.

At 1010 the UE 115 may select at least one candidate beam from a set of candidate beams for a dynamic measurement during one of a first subset of the set of scheduled synchronization signal transmission times, where the first subset of the set of scheduled synchronization signal transmission times is allocated for dynamic measurement. The operations of 1010 may be performed according to the methods described herein. In certain examples, aspects of the operations of 1010 may be performed by a dynamic beam selector as described with reference to FIGS. 6 through 9.

At 1015 the UE 115 may perform a measure procedure on the at least one candidate beam during the one of the first subset of scheduled synchronization signal transmission times. The operations of 1015 may be performed according to the methods described herein. In certain examples, aspects of the operations of 1015 may be performed by a measurement unit as described with reference to FIGS. 6 through 9.

At 1020 the UE 115 may transmit at least one measurement report corresponding to the measure procedure performed on the at least one candidate beam. The operations of 1020 may be performed according to the methods described herein. In certain examples, aspects of the operations of 1020 may be performed by a measurement report generator as described with reference to FIGS. 6 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like).

An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   determining a set of scheduled synchronization signal transmission times;
   selecting at least one candidate beam from a set of candidate beams for a dynamic measurement during one of a first subset of the set of scheduled synchronization signal transmission times, wherein the first subset of the set of scheduled synchronization signal transmission times is allocated for dynamic measurement;
   performing a measure procedure on the at least one candidate beam during the one of the first subset of scheduled synchronization signal transmission times; and
   transmitting at least one measurement report corresponding to the measure procedure performed on the at least one candidate beam.

2. The method of claim 1, wherein performing the measure procedure on the at least one candidate beam during the one of the first subset of scheduled synchronization signal transmission times comprises:
   selecting a UE receive beam for the one of the first subset of scheduled synchronization signal transmission times; and
   selecting the at least one candidate beam from a subset of the set of candidate beams corresponding to the selected UE receive beam.

3. The method of claim 1, wherein the set of scheduled synchronization signal transmission times is determined based at least in part on a search and measure period.

4. The method of claim 3, wherein performing the measure procedure on the at least one candidate beam during the one of the first subset of scheduled synchronization signal transmission times comprises:
   identifying a set of priority candidate beams from the set of candidate beams; and
   performing the measure procedure on each of the set of priority candidate beams at least once during the search and measure period.

5. The method of claim 1, wherein the at least one candidate beam is selected from the set of candidate beams based at least in part on a fairness metric, a signal strength metric, a spatial metric, a timing metric, or a combination thereof.

6. The method of claim 5, wherein the fairness metric comprises a weighted fairness metric.

7. The method of claim 5, wherein the signal strength metric comprises a signal strength based on historical measurements.

8. The method of claim 5, wherein the spatial metric comprises a spatial distance from a serving beam.

9. The method of claim 5, wherein the timing metric comprises a no visit time.

10. The method of claim 1, further comprising:
    performing a beam sweep procedure for each of a set of UE receive beams during a second subset of the set of scheduled synchronization signal transmission times different than the first subset of the set of scheduled synchronization signal transmission times, wherein the second subset of the set of scheduled synchronization signal transmission times is allocated for static measurement based at least in part on a number of UE receive beams in the set of UE receive beams.

11. The method of claim 10, further comprising:
    performing an additional measure procedure on at least one beam identified based at least in part on the beam sweep procedure during the second subset of the set of scheduled synchronization signal transmission times.

12. The method of claim 10, wherein the set of candidate beams is determined based at least in part on the beam sweep procedure for each of the set of UE receive beams.

13. An apparatus for wireless communication at a user equipment (UE), comprising:

means for determining a set of scheduled synchronization signal transmission times;

means for selecting at least one candidate beam from a set of candidate beams for a dynamic measurement during one of a first subset of the set of scheduled synchronization signal transmission times, wherein the first subset of the set of scheduled synchronization signal transmission times is allocated for dynamic measurement;

means for performing a measure procedure on the at least one candidate beam during the one of the first subset of scheduled synchronization signal transmission times; and means for transmitting at least one measurement report corresponding to the measure procedure performed on the at least one candidate beam.

14. The apparatus of claim 13, wherein the means for performing the measure procedure on the at least one candidate beam during the one of the first subset of scheduled synchronization signal transmission times comprises:

means for selecting a UE receive beam for the one of the first subset of scheduled synchronization signal transmission times; and means for selecting the at least one candidate beam from a subset of the set of candidate beams corresponding to the selected UE receive beam.

15. The apparatus of claim 13, wherein the set of scheduled synchronization signal transmission times is determined based at least in part on a search and measure period.

16. An apparatus for wireless communication at a user equipment (UE), comprising:

a processor; and memory coupled to the processor, the processor and memory configured to:

determine a set of scheduled synchronization signal transmission times;

select at least one candidate beam from a set of candidate beams for a dynamic measurement during one of a first subset of the set of scheduled synchronization signal transmission times, wherein the first subset of the set of scheduled synchronization signal transmission times is allocated for dynamic measurement;

perform a measure procedure on the at least one candidate beam during the one of the first subset of scheduled synchronization signal transmission times; and transmit at least one measurement report corresponding to the measure procedure performed on the at least one candidate beam.

17. The apparatus of claim 16, wherein, to perform the measure procedure on the at least one candidate beam during the one of the first subset of scheduled synchronization signal transmission times, the processor and memory are configured to:

select a UE receive beam for the one of the first subset of scheduled synchronization signal transmission times; and select the at least one candidate beam from a subset of the set of candidate beams corresponding to the selected UE receive beam.

18. The apparatus of claim 16, wherein the set of scheduled synchronization signal transmission times is determined based at least in part on a search and measure period.

19. The apparatus of claim 18, wherein, to perform the measure procedure on the at least one candidate beam during the one of the first subset of scheduled synchronization signal transmission times, the processor and memory are configured to:

identify a set of priority candidate beams from the set of candidate beams; and perform the measure procedure on each of the set of priority candidate beams at least once during the search and measure period.

20. The apparatus of claim 16, wherein the at least one candidate beam is selected from the set of candidate beams based at least in part on a fairness metric, a signal strength metric, a spatial metric, a timing metric, or a combination thereof.

21. The apparatus of claim 20, wherein the fairness metric comprises a weighted fairness metric.

22. The apparatus of claim 20, wherein the signal strength metric comprises a signal strength based on historical measurements.

23. The apparatus of claim 20, wherein the spatial metric comprises a spatial distance from a serving beam.

24. The apparatus of claim 20, wherein the timing metric comprises a no visit time.

25. The apparatus of claim 16, wherein the processor and memory are further configured to:

perform a beam sweep procedure for each of a set of UE receive beams during a second subset of the set of scheduled synchronization signal transmission times different than the first subset of the set of scheduled synchronization signal transmission times, wherein the second subset of the set of scheduled synchronization signal transmission times is allocated for static measurement based at least in part on a number of UE receive beams in the set of UE receive beams.

26. The apparatus of claim 25, wherein the processor and memory are further configured to:

perform an additional measure procedure on at least one beam identified based at least in part on the beam sweep procedure during the second subset of the set of scheduled synchronization signal transmission times.

27. The apparatus of claim 25, wherein the set of candidate beams is determined based at least in part on the beam sweep procedure for each of the set of UE receive beams.

28. The apparatus of claim 16, wherein the processor and memory are further configured to:

configure a transmitter to transmit the at least one measurement report; and configure the transmitter, a receiver, or both for communication based at least in part on the at least one measurement report.

29. A non-transitory computer-readable medium storing code for wireless communication at a user equipment (UE), the code comprising instructions executable by a processor to:

determine a set of scheduled synchronization signal transmission times;

select at least one candidate beam from a set of candidate beams for a dynamic measurement during one of a first subset of the set of scheduled synchronization signal transmission times, wherein the first subset of the set of scheduled synchronization signal transmission times is allocated for dynamic measurement;

perform a measure procedure on the at least one candidate beam during the one of the first subset of scheduled synchronization signal transmission times; and transmit at least one measurement report corresponding to the measure procedure performed on the at least one candidate beam.

30. The non-transitory computer-readable medium of claim 29, wherein the instructions to perform the measure procedure on the at least one candidate beam during the one of the first subset of scheduled synchronization signal transmission times are executable by the processor to:
  select a UE receive beam for the one of the first subset of scheduled synchronization signal transmission times; and
  select the at least one candidate beam from a subset of the set of candidate beams corresponding to the selected UE receive beam.

* * * * *